No. 642,692. Patented Feb. 6, 1900.
E. C. HOFFMAN.
TIRE SETTING MACHINE.
(Application filed Sept. 28, 1898.)
(No Model.) 2 Sheets—Sheet 1.
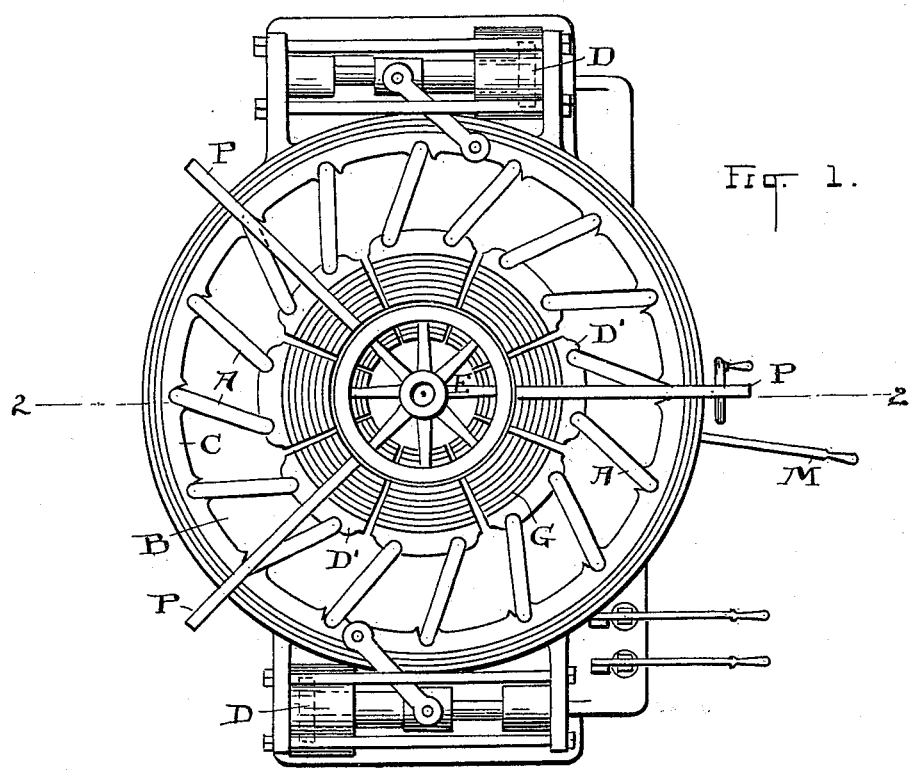
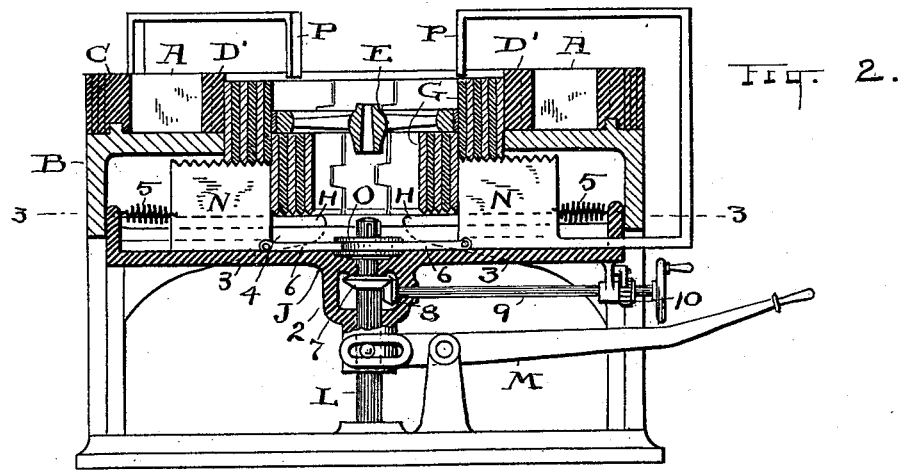
ATTEST
R. B. Moser
H. E. Mudra
INVENTOR
Edward C. Hoffman
BY H. F. Fisher
ATTY.

No. 642,692. Patented Feb. 6, 1900.
E. C. HOFFMAN.
TIRE SETTING MACHINE.
(Application filed Sept. 28, 1898.)
(No Model.) 2 Sheets—Sheet 2.
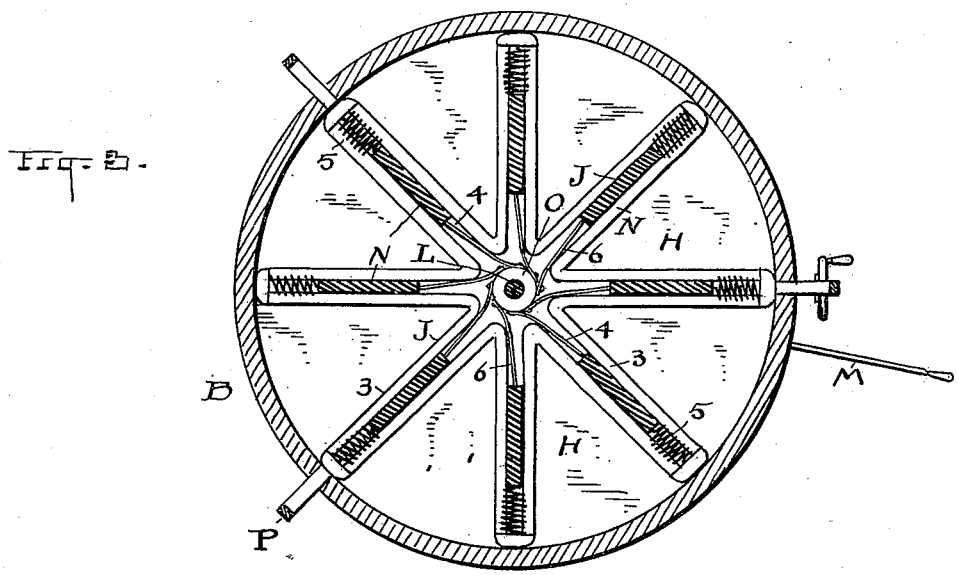
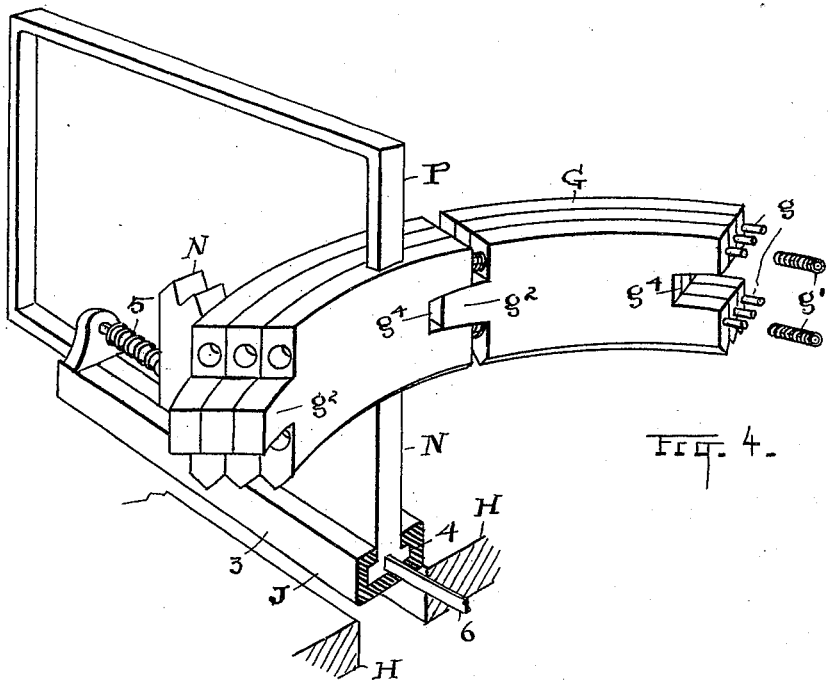

UNITED STATES PATENT OFFICE.

EDWARD C. HOFFMAN, OF CLEVELAND, OHIO.

TIRE-SETTING MACHINE.

SPECIFICATION forming part of Letters Patent No. 642,692, dated February 6, 1900.

Application filed September 28, 1898. Serial No. 692,104. (No model.)

*To all whom it may concern:*

Be it known that I, EDWARD C. HOFFMAN, a citizen of the United States, residing at Cleveland, in the county of Cuyahoga and State of Ohio, have invented certain new and useful Improvements in Tire-Setting Machines; and I do declare that the following is a full, clear, and exact description of the invention, which will enable others skilled in the art to which it appertains to make and use the same.

My invention relates to tire-setting machines, and is adapted to be used with either the West or the Zeller machine, or modifications of either, in which setting the tire cold and by compression is practiced. In both the machines named the compression mechanism is designed to be employed for all sizes of wheels as they may come, large and small, and to adapt the machine to different sizes it is necessary to have on hand a large assortment of different sizes of blocks and plates out of which combinations are made for each particular wheel, according to its size. These blocks and plates are loose parts which require handling to be placed and then again redistributed and replaced, according to the size of each wheel. In a repair-shop this constant and extensive handling of the many heavy pieces entails a vast amount of hard labor, as well as consuming much valuable time, and this, taken with the time required to make calculations for the right combinations of blocks and plates to fill the space they occupy between the mechanically connected and operating parts of the machine and the wheel, renders it at least very desirable that there should be improvement in these particulars, which have become a standing objection to the machine itself, notwithstanding its many other advantages. Indeed, the time and labor expended in getting the machine ready to set a tire are out of all reasonable proportion to the time consumed in the setting itself, because the setting operation is the work of comparatively few minutes.

The object of the present invention, therefore, is to wholly obviate the use of detached blocks and plates which are rendered available only by hand labor and which have necessarily been the subject of so much careful calculation to get the right combinations for the ascertained size of tire to be set, as the case might be, and instead to introduce and employ mechanically connected and operated parts which can in a few moments be brought into working position and which are readily adaptable to any and all sizes of wheels.

To these ends the invention consists in the construction and combination of parts, substantially as shown and described, and particularly pointed out in the claims.

In the accompanying drawings, Figure 1 is a plan view of what is known as the "Zeller" machine and my improvements incorporated therewith. Fig. 2 is a cross-section of Fig. 1 on a line corresponding substantially to line 2 2, Fig. 1. Fig. 3 is a plan view of a part of my added mechanism as seen looking down from a line corresponding to 3 3, Fig. 2. Fig. 4 is a perspective elevation, enlarged, of a portion of my new mechanism, showing a series of the filling-in segments and the means for connecting the same.

In Fig. 1 particularly are shown the toggle-plates A, the fixed base part B, and the actuating-ring C, by which said toggle-plates are operated, suitable engines or pumps D being employed to develop the power necessary for this purpose. A series of segmental shoes D' is shown, which in this instance are each connected with two adjacent links A, and these shoes are arranged in a circle and are designed to have a uniform movement, so as to close in toward the tire evenly at all points and maintain a true circle. If the compression-cylinders of the West machine were employed instead of the toggles here shown, the action on the shoes we may assume would be substantially the same as in this instance, and hence up to this point it is immaterial to my improvement whether one system or the other be employed or some equivalent thereof having a like effect, especially as my invention is an adaptation or addition to what each has, rather than an improvement on the machine itself. Assuming, therefore, that in any event we have the segmental shoes or their equivalent in the machine, we come to the limit of the machine proper in this direction, and whatever has heretofore come between the shoes and the wheel E, centrally within them, Fig. 1, has been built in by hand with blocks and plates, as hereinbefore described, and the action of the shoes has been against or upon these and through them upon the wheel. Now it is here also that my invention begins, and in lieu of the said loose blocks and plates I employ a series of segments G of uniform thickness and depth and concentrically arranged end to end, eleven deep in this instance. More or fewer of these rings of segments might, however, be used, and assuming, for example, that the present segments have an equal thickness of one inch they may be heavier or lighter than this and serve the same purpose. All the segments are supported primarily and normally on a bottom or base plate or support H, which has radiating slots in which rest the radiating arms of the lift-spider J, Fig. 3, a cross-section of one of the said arms being shown in Fig. 4. The spider J itself resembles a wheel in outline, having a hub 2 engaged upon the standard-spindle L and adapted to slide thereon and provided with radiating arms 3, corresponding to the spokes of a wheel. A suitable lever M, to be operated by hand or foot and fulcrumed on the base of the machine, serves to raise and lower the spider J as much as may be needed.

Each arm 3 has a longitudinal channel 4 in its top, in which is engaged a T-headed plate N, having notches in its upper edge corresponding to the lower beveled edges of the several rings of segments G. The plates N are adapted to slide in the channels 4 and normally are held in the outer ends thereof by the springs 5. Against the tension of these springs the several plates are all drawn inward in slots 4, according as they are to raise one or more of the rings of segments G by means of the rotating head O, which is within the hub 2 on the spindle L. Suitable links 6 connect said head with the plates N, and the head O is rotated in this instance by bevel-pinions 7 and 8 and shaft 9, a pawl and ratchet 10 serving to hold shaft 9 at any point of its rotation. Of course any equivalent mechanism for moving plate N in its channel in either direction may be adopted in lieu of what is here shown. So, also, may any suitable lift mechanism for said plates be adopted and not depart from the spirit of my invention. In the present case I show five of the rings G raised to engage the wheel E. I might raise all of said rings at once or only one or more, according to the size of the tire to be set, and when they are released through the gears and shaft 7, 8, and 9 they are at once drawn back, so that all said plates are free; but releasing does not occur until all said plates are lowered through the lever M. Centering and gage arms P are shown as connected in this instance with three of the plates N and overhanging the said plates G—say as shown in Fig. 2—so as to accurately center the wheel when it is placed in the machine and at the same time serve as a gage or guide to tell how many of the rings G are to be raised. When the plates N are drawn inward to engage one or more rings G, the centering-arms will move inward also, and when said arms have centered the wheel and bear against all around the limit of movement is reached and nothing remains to do but to raise the engaged rings G to active position. This alone will fill the space within the shoes D' sufficiently to do the work without further or other filling-in parts, and the work of setting the tire can at once take place. Finally, in order that the segments G shall be kept in their open relation, substantially as seen in Fig. 4, when not under pressure, I connect them with dowel-pins $g$ and springs $g'$ of strength enough to spread the segments after use and keep them apart, and to avoid the necessity of a plate N for each set of segments G and that one plate may help to raise three or more sets of segments, as well as to avoid buckling of the tire at the point of meeting between the said plates, I form each segment with a tongue $g^2$, which enters a corresponding recess $g^4$ in the next opposite segment in the same ring, and thus overlap the joint at a point opposite the tire and connect the segments in such manner that they help to lift each other.

It will be understood that my invention is adapted to be attached to or connected with the tire-setting machine hereinbefore mentioned which are now in use, as well to or with those which shall hereafter be built, and that my attachments constitute in themselves a complete article of manufacture and sale.

If desired, the segments G can be supported from the shoes D' by suitable means instead of supporting them on the part H, and in this case they would be carried back and forth with the shoes.

What I claim as new, and desire to secure by Letters Patent, is—

1. The tire-setting machine substantially as described having compressing mechanism, segments in concentric circles within said compressing mechanism and means to raise and lower some of said segments into and out of range of said compressing mechanism, substantially as described.

2. A tire-setting machine having compressing mechanism, and a series of concentric rings consisting each of segments to be interposed between said mechanism and the tire, and a support for said rings constructed and arranged to move them up and down into and out of range of said compressing mechanism, substantially as described.

3. A tire-setting machine having compressing mechanism, rings to directly engage the tire and means beneath the said rings to raise and lower the same into and out of range of said compressing mechanism, substantially as described.

4. The machine substantially as described, consisting of the series of movable parts arranged in concentric circles to engage the tire and mechanism beneath said movable parts constructed to raise the circular series one or more at a time, substantially as described.

5. A series of concentric segmental rings and means to raise one or more of said rings at a time, in combination with compressing mechanism to bear uniformly against the outside of said rings, substantially as described.

6. A series of rings consisting each of segments and arranged one within the other, means to raise one or more rings at a time and a series of shoes to press uniformly against said raised rings, substantially as described.

7. The series of sectional concentric rings arranged one behind the other and means to raise and lower the same comprising movable engaging plates constructed to lift one or more of said plates and leave the others, in combination with lift mechanism for said plates and rings, substantially as described.

8. The series of concentric rings formed of segments, and tongues and recesses in the ends of said segments and dowel-pins and springs above and below said tongues and recesses, in combination with tire-compressing mechanism to bear against said rings, substantially as described.

9. The series of segmental sectional rings, movable plates arranged to engage one or more rings at a time, and guideways on which said plates are adapted to slide, in combination with compression mechanism, substantially as described.

10. A series of segmental concentric rings, a fixed supporting-base for the rings, a movable spider and movable plates thereon to raise one or more of the rings at a time, substantially as described.

11. The ring-supporting base and the concentric rings thereon, in combination with an armed member constructed and arranged to raise said rings from their base, and interposed movable parts to directly engage one or more of said rings, substantially as described.

12. The concentric segmental rings and the movable parts to engage and raise them, in combination with an armed member in which said movable parts are adapted to slide, and means to move said parts back and forth in said arms, substantially as described.

13. In a tire-setting machine, the combination of the vertically-movable concentric rings, lift mechanism to engage and raise one or more rings at a time, and means to center the wheel, substantially as described.

14. The spider for raising the rings having channels in its top, movable plates in said channels, means to move said plates simultaneously back and forth and springs behind said plates, substantially as described.

15. The concentric segmental rings loosely connected at their ends, means to determine the number of rings to be used at any time and means to raise said rings, substantially as described.

16. The concentric segmental rings and means to raise and lower the same, in combination with wheel-centering gage-arms and mechanism, substantially as described.

Witness my hand to the foregoing specification this 23d day of September, 1898.

EDWARD C. HOFFMAN.

Witnesses:
H. T. FISHER,
R. B. MOSER.